US012715972B2

(12) United States Patent
Bai et al.

(10) Patent No.: US 12,715,972 B2
(45) Date of Patent: Aug. 25, 2026

(54) ENVIRONMENTALLY FRIENDLY, EFFICIENT AND LOW-COST METHOD FOR PREPARING PHYSICAL FOAMING MATERIALS

(71) Applicant: Jiangsu Daimaoniu New Material Technology Co., Ltd., Nanjing (CN)

(72) Inventors: Peng Bai, Nanjing (CN); Zhenxiu Zhang, Nanjing (CN)

(73) Assignee: Jiangsu Daimaoniu New Material Technology Co., Ltd., Nanjing (CN)

( * ) Notice: Subject to any disclaimer, the term of this patent is extended or adjusted under 35 U.S.C. 154(b) by 25 days.

(21) Appl. No.: 17/773,857

(22) PCT Filed: Mar. 8, 2022

(86) PCT No.: PCT/CN2022/079784
§ 371 (c)(1),
(2) Date: May 3, 2022

(87) PCT Pub. No.: WO2023/010842
PCT Pub. Date: Feb. 9, 2023

(65) Prior Publication Data

US 2024/0174830 A1 May 30, 2024

(30) Foreign Application Priority Data

Aug. 5, 2021 (CN) ......................... 202110896999.2

(51) Int. Cl.
*C08J 9/12* (2006.01)
*B29C 44/34* (2006.01)
(Continued)

(52) U.S. Cl.
CPC ........... *C08J 9/127* (2013.01); *B29C 44/3403* (2013.01); *B29C 44/3453* (2013.01); *C08J 9/122* (2013.01);
(Continued)

(58) Field of Classification Search
CPC . B29C 44/022; B29C 44/027; B29C 44/3453; B29C 44/3403; C08J 2201/032;
(Continued)

(56) References Cited

U.S. PATENT DOCUMENTS

2013/0079430 A1 * 3/2013 Jintoku .................... C08J 9/122 521/134

FOREIGN PATENT DOCUMENTS

CN 107627527 A * 1/2018

OTHER PUBLICATIONS

CN 107627527 (Year: 2018).*
Machine Translation of CN 107627527 (Year: 2019).*

* cited by examiner

*Primary Examiner* — Christina H.W. Rosebach
(74) *Attorney, Agent, or Firm* — Jose Cherson Weissbrot

(57) ABSTRACT

The invention relates to the technical field of physical foaming, in particular to an environmentally friendly, efficient and low-cost method for preparing physical foaming materials. The method includes the following steps: place plates to be foamed in a reaction kettle, inject permeable medium for soaking treatment, saturate in the inert gas, and then foam at the high temperature condition; the temperature of the high temperature condition is not less than 80 DEG C. In the method for preparing physical foaming materials in the invention, the plates are treated with water and other permeable media, and the kettle foaming process is adopted to shorten the saturation time, thereby greatly improving the foaming efficiency and the performances of the foaming materials such as pore size homogeneity, pore distribution uniformity and foaming rate.

6 Claims, 4 Drawing Sheets

(51) Int. Cl.
*C08J 9/14* (2006.01)
*B29K 23/00* (2006.01)

(52) U.S. Cl.
CPC ............... *C08J 9/125* (2013.01); *C08J 9/141* (2013.01); *B29K 2023/0625* (2013.01); *C08J 2203/06* (2013.01); *C08J 2203/10* (2013.01); *C08J 2203/14* (2013.01); *C08J 2203/202* (2013.01); *C08J 2323/12* (2013.01); *C08J 2423/06* (2013.01)

(58) Field of Classification Search
CPC ... C08J 9/122; C08J 9/125; C08J 9/141; C08J 9/127; C08J 9/18; C08J 2203/06; C08J 2203/10; C08J 2203/14; C08J 2203/202; C08J 2323/12; C08J 2423/06; B29K 2023/0625; C08L 2203/14; C08L 23/12; Y02P 20/10
See application file for complete search history.

ENVIRONMENTALLY FRIENDLY, EFFICIENT AND LOW-COST METHOD FOR PREPARING PHYSICAL FOAMING MATERIALS

TECHNICAL FIELD

The invention relates to the technical field of physical foaming, in particular to an environmentally friendly, efficient and low-cost method for preparing physical foaming materials.

BACKGROUND

Polymer foaming material is a gas/solid two-phase composite material with polymer as a matrix and gas as a dispersed phase. At present, the preparation process of thermoplastic foaming materials mainly includes chemical foaming and physical foaming. Chemical foaming is that the raw materials of the foaming materials are mixed with the components of the chemical foaming agent and then conveyed to the corresponding mold cavity, and the foaming agent is decomposed to produce gases to obtain the foaming materials by foam molding. During the preparation process, a large number of components of the chemical foaming agent are required. On the one hand, the method is less environmentally friendly, the safety in the production process needs to be improved, and residual chemical components in the foaming materials will affect the performances of the product; on the other hand, a large number of components of the chemical foaming agent are required for preparing the low-density foaming materials, and a lame number of cavities are easily formed between adjacent cells, so that the uniformity of cells and the cell closing rate are difficult to control. Physical foaming is that inert gas is infiltrated into the foaming material tinder a certain pressure, and then the pressure and the temperature are adjusted to release the gases to form pores and get foaming materials.

However, the process of the traditional physical foaming method is redundant, and the injected inert gas can permeate into the plates only after long-time saturation, so that the traditional physical foaming method has low production efficiency and high cost. In addition, the permeation uniformity of the inert gas on the plates is not easy to control, and the saturated plates are not heated uniformly in heating foaming process, the pore size homogeneity, the pore distribution uniformity, the foaming rate and other properties of the foaming products are greatly affected.

SUMMARY

Aiming at the above problems, the invention provides an environmentally friendly, efficient and low-cost method for preparing physical foaming materials. After the plates are treated with water and other permeable media, and the kettle foaming process is adopted, thereby greatly improving the foaming efficiency and the performances of the foaming materials such as pore size homogeneity, pore distribution uniformity and foaming rate.

In concrete, the invention provides an environmentally friendly, efficient and low-cost method for preparing physical foaming materials in the first aspect, which includes the following steps: place plates to be foamed in a reaction kettle, inject permeable medium for soaking treatment, saturate in the inert gas, and then foam at the high temperature condition; the temperature of the high temperature condition is not less than 80 DEG C.

As a preferred technical proposal of the invention, the permeable medium is polar fluid or non-polar fluid; preferably, the polar fluid includes water.

As a preferred technical proposal of the invention, the non-polar fluid includes liquid alkanes whose boiling point is not higher than 10.5 DEG C.

As a preferred technical proposal of the invention, the non-polar fluid is selected from one or more of pentane, cyclopentane, hexane, heptane and isopentane.

As a preferred technical proposal of the invention, the plates are heated during the soaking process; preferably, the temperature of the reaction kettle is 80-110 DEG C.

As a preferred technical proposal of the invention, the saturation pressure in the kettle during the saturation process is 20-60 MPa.

As a preferred technical proposal of the invention, the saturation time in the saturation process is at least 1 hour.

As a preferred technical proposal of the invention, the raw materials of the plates to be foamed is polyolefin materials; preferably, the polyolefin materials are selected from one or more of LDPE. LLDPE, m-LLDPE, HDPE and PP.

As a preferred technical proposal of the invention, the polyolefin materials include LLDPE and PP, wherein the content of PP is not less than 40 wt %.

The invention provides a physical foaming material in the second aspect, which is prepared by the environmentally friendly, efficient and low-cost method for preparing physical foaming materials.

The invention has the following beneficial effects: in the method for preparing physical foaming materials in the invention, the plates are treated with water and other permeable media, and the kettle foaming process is adopted to shorten the saturation time, thereby greatly improving the foaming efficiency and the performances of the foaming materials such as pore size homogeneity, pore distribution uniformity and foaming rate.

DETAILED DESCRIPTION OF THE EMBODIMENTS

Figure 1:
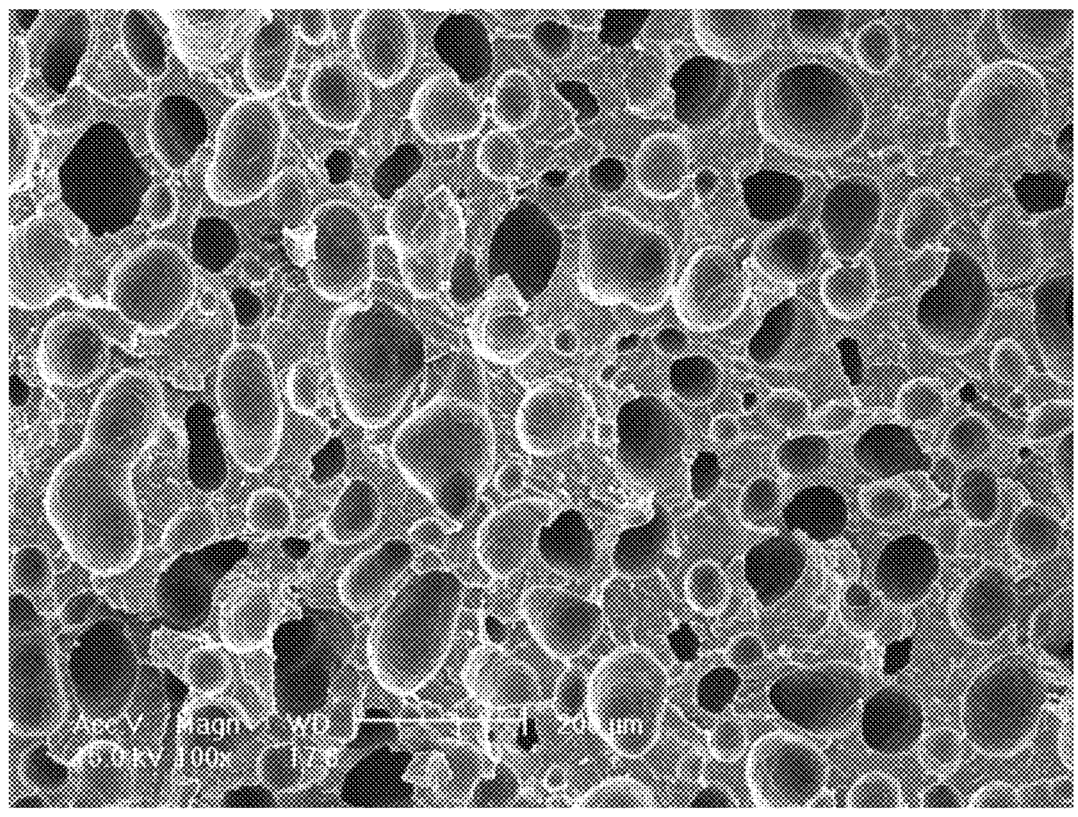
FIG. 1 is the SEM image of the example 1 sample with magnification of 100 times.
Figure 2:
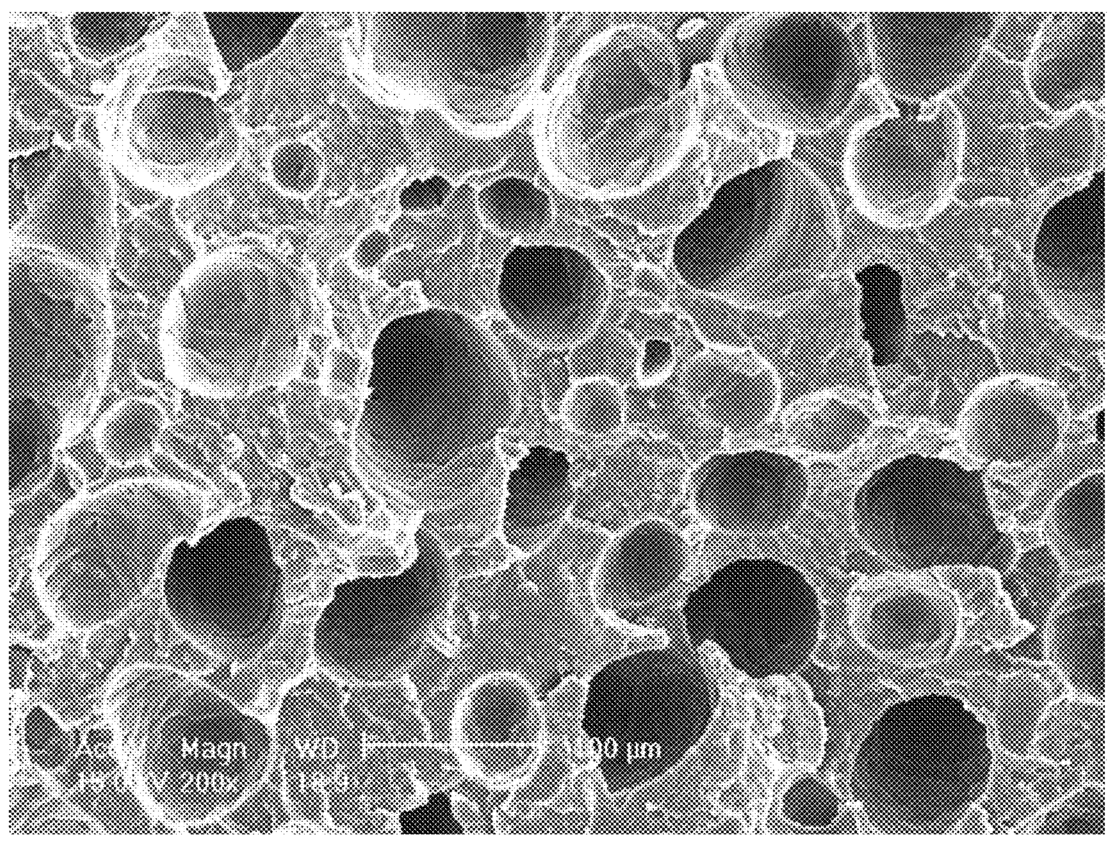
FIG. 2 is the SEM image of (lie example 1 sample with magnification of 200 times.
Figure 3:
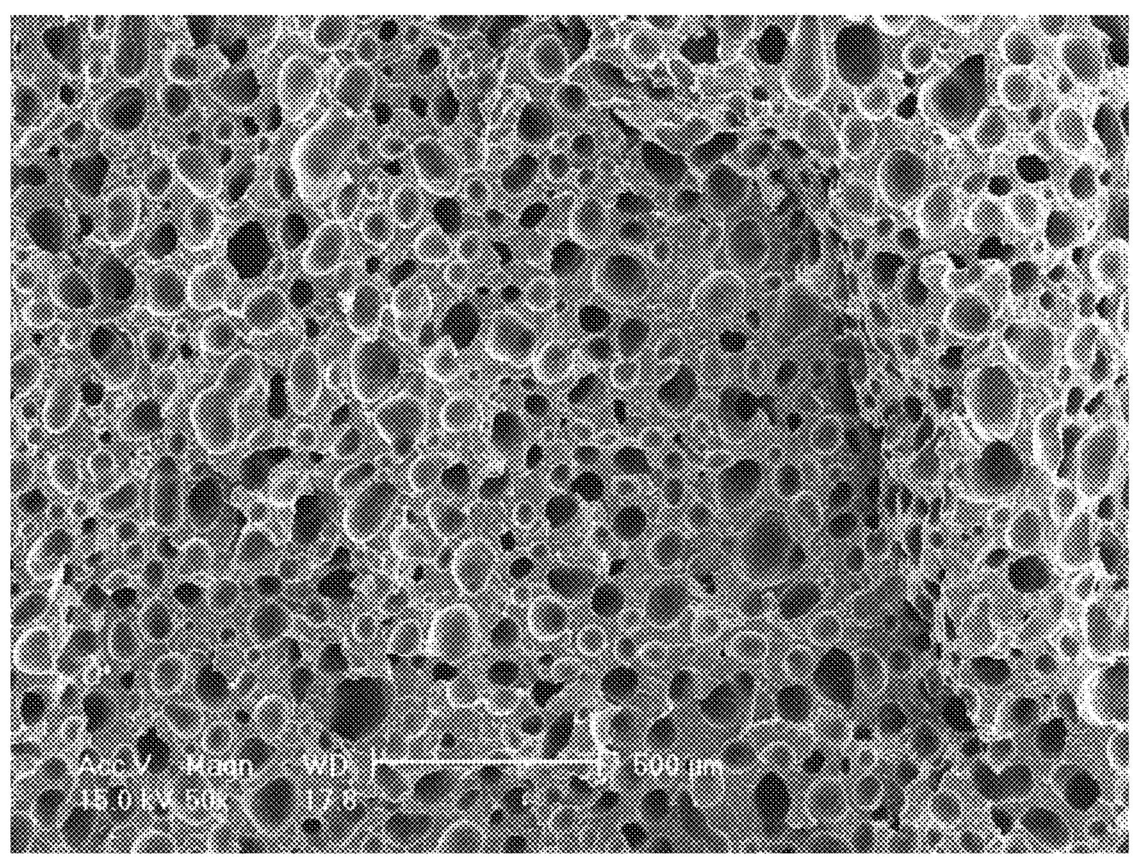
FIG. 3 is the SEM image of the example 1 sample with magnification of 50 times.
Figure 4:
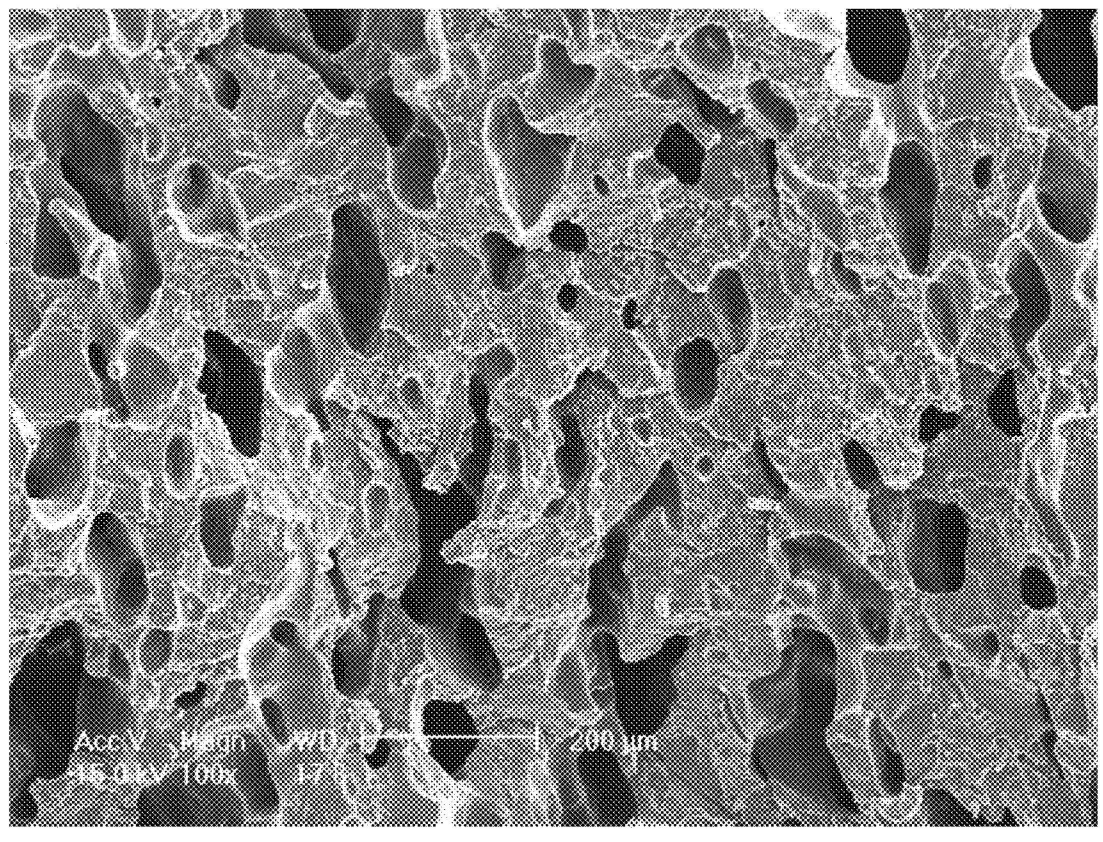
FIG. 4 is the SEM image of the example 4 sample with magnification of 100 times.

The contents of the invention can be further understood in combination with the following detailed description of example cases and embodiments and the included examples in the invention.

The invention provides an environmentally friendly, efficient and low-cost method for preparing physical foaming materials in the first aspect, which includes the following steps: place plates to be foamed in a reaction kettle, inject permeable medium for soaking treatment, saturate in the inert gas, and then foam at the high temperature condition; the temperature of the high temperature condition is not less than 80 DEG C.

In the invention, the plates to be foamed is placed on the shelf and then put into the reaction kettle for saturation, so that the material to be foamed can be made into products with different shapes and structures, and different products can be obtained by foaming. In the invention, no special limitation is made to the material of the shelf, and various materials familiar to the technicians in the field can be selected.

In the invention, no special limitation is made to the preparation method of plates to be foamed. The foaming materials can be prepared by the conventional methods, for example, different foaming materials can be mixed and then extruded by a twin-screw extruder for granulation; or the foaming materials are mixed by an internal mixer and extruded by a single-screw extruder for granulation, and granules are prepared by extrusion molding and other ways to obtain plates for further foaming. In the invention, the plates are placed in the drying channel line or drying oven after permeation treatment and saturation treatment, and heated for foaming. The plates have been treated by permeation, and the penetrant can transfer the heat to the inside and outside of the plates faster, so that the plates are heated more evenly, and the inert gas in the plates is expanded more evenly and stably to for pores with uniform size and structure, being conducive to obtaining the foaming material with excellent overall performance.

In the invention, an appropriate amount of permeable medium is added to soak the extruded plates after being placed in the reaction kettle, so that the permeable medium permeates into the plates. The permeable medium in the invention can be conventional liquid component. In order to avoid the corrosion of the permeable medium to the reaction kettle and the shelf where the plates are placed, the non-corrosive inert liquid medium is preferred.

In some embodiments, the permeable medium is polar fluid or non-polar fluid; preferably, the polar fluid includes water.

In the invention, an appropriate amount of additives can be added to the permeable medium to improve the penetrability of the permeable medium into the plates and the permeability uniformity. The additives in the invention are non-polar fluids. Surfactants can also be used to help adjust the surface tension and assist in foaming the components that gases are saturated quickly in the plates.

In some embodiments, the non-polar fluid includes liquid alkanes whose boiling point is not higher than 105 DEG C.

In some embodiments, the non-polar fluid is selected from one of more of pentane, cyclopentane, hexane, heptane and isopentane.

For the purpose of the invention, fluid means any, substance capable of flowing under normal temperature and pressure, including but not limited to some solvents, etc.

In some embodiments, the weight ratio of water to non-polar fluid is (1-8):1; further, the weight ratio is (3-5):1.

In some embodiments, the plates are heated during the soaking process. In the invention, the temperature of the reaction kettle can be regulated according to the specific selection of the permeable medium and the different ratios. In some embodiments, the temperature of the reaction kettle during the permeation treatment is 25-250 DEG C.

In the invention, after the plates are treated with permeable medium, the inert gas is injected, and (lie pressure in the kettle is adjusted so that the inert gas permeates into the plates. As the plates have been treated by permeable medium, the inert gas in the kettle can be more evenly guided to the inside of the plates, which plays a certain role in promoting the permeation and diffusion of inert gas. Moreover, the diffusion rate of the inert gas in the permeable medium is faster than that in the solid plates, so the saturation time of the plates in the kettle can be greatly shortened, and the plates to be foamed with inert gas distributed evenly can be obtained in a short time.

In the invention, the pressure in the reaction kettle is regulated in the saturation process according to the characteristics of foaming materials, whether permeable medium is used, and the saturation time and other factors.

In some embodiments, the saturation pressure in the kettle during the saturation process is 20-60 MPa, and the saturation time is 1-24 hours.

In some embodiments, the raw materials of the plates to be foamed is polyolefin materials; preferably, the polyolefin materials are selected from one or more of LDPE. LLDPE, m-LLDPE, HDPE and PP.

In some embodiments, the polyolefin materials include LLDPE and PP, wherein the content of PP is not less than 40 wt %.

Further, the weight ratio of LLDPE to PP is (1-5):(6-9); further, the weight ratio of LLDPE to PP is 3.3:6.7.

In the invention, the applicant adds an appropriate amount of LLDPE materials to the foaming materials to prevent the excessively high crystallinity of the plates obtained after melting extrusion of PP materials from affecting the diffusion and uniform distribution of the permeable medium and the inert gas inside the plates and therefore affecting the subsequent foaming uniformity. The applicant finds that the foaming performance of the materials can be significantly improved after adding the appropriate amount of LLDPE materials, and supposes that the short chain branched structure in LLDPE structure can obstruct the close packing and ordered arrangement of PP polymer molecular chain, so that the random phase content in the microstructure of the foaming material is increased to help the uniform diffusion and distribution of penetrant, and the penetrant can further guide the uniform saturation of inert gas in the plates to form a large number of bubble nuclei in the plates, thereby, helping improve the cell uniformity of the foaming materials. However, the applicant finds that the foaming effect of the foaming materials is seriously reduced when the content of LLDPE in the system is too high (especially when the content of LLDPE is close to that of PP), and a large number of uneven cells appear, which significantly reduces the resilience of the foaming materials. Due to the great difference in cohesion strength between PP material and LLDPE material, poor compatibility between materials results in a certain phase separation interface on the microstructure of the plate. After the plate is saturated with inert gas at high pressure, a large number of bubble nuclei are formed in the plate and form a lot of stress concentration points on the phase separation interface in the plate during the high temperature foaming process to expand the surrounding cells, resulting in the parallel connection of the adjacent cells and causing problems of cell size heterogeneity, uneven distribution, etc.

Further, the density of LLDPE is 0.90-0.935 g/cm$^3$; further, the density of LLDPE is 0.915-0.930 g/cm$^3$; further, the density of LLDPE is 0.924 g/cm$^3$. The densities are measured according to ASTM D1505 standard.

Further, the melt index of LLDPE is 18-25 g/10 min at 190° C./2.16 kg; further, the melt index of LLDPE is 21 g/10 min at 190° C./2.16 kg. The melt index in the invention refers is the melt flow index, which is a parameter characterizing the flow performance of the material in the solution state and can be tested according to ASTM D1238 standard. LLDPE in the invention can be relevant product in the market, such as FPC 3470LLDPE product.

Further, the density of PP is 0.89-0.92 g/$cm^3$; further, the density of PP is 0.89-0.91 g/$cm^3$; further, the density of PP is 0.90 g/$cm^3$. The densities are measured according to ISO 1183 standard.

Further, the melt index of PP is 5-10 g/10 min at 190° C./2.16 kg; further, the melt index of PP is 7 g/10 min at 190° C./2.16 kg PP in the invention can be relevant product in the market, such as FPC 5061 polypropylene.

In the invention, the saturated plate is baked in an oven or on a drying channel line at a certain temperature to foam. In the invention, the foaming temperature is not less than 80 DEG C.; preferably, the foaming temperature is 90-125 DEG C; further, the foaming temperature is 105-120 DEG C.

The applicant finds that the content of LLDPE in the foaming material can be further increased and the foaming property of the material could be further improved after the densities and melt indexes of LLDPE and PP materials are optimized; especially when the melt index (preferably within the range of 5-10 g/10 min) of PP material is lower than that (preferably within the range of 18-25 g/10 min) of LLDPE and the densities of the two are close, the content of LLDPE in the foaming material is more than 30 wt %, the density of the obtained material is low, and the cells are distributed uniformly. The applicant supposes that the difference between the cohesive energy densities of LLDPE and PP materials is not big and the difference in energy required for diffusion and migration between molecular chain segments is small at the above conditions, so that energy between LLDPE and PP materials can fully diffuse and merge with each other, and uniform stress can be received when the bubble nuclei swell at a certain temperature to form the cells, thereby prevent the cells from being broken and connected in parallel.

In some embodiments, the temperature of the reaction kettle is 80-110 DEG C. when the foaming material is used and the permeable medium is added; further, the temperature of the reaction kettle is 85-96 DEG C.; further, the permeable medium is a mixture of water and cyclopentane; further, the weight ratio of water to cyclopentane is 3.2:1.2.

In some embodiments, when the foaming material is used, the saturation pressure in the kettle is 22-55 MPa during the saturation process; further, the saturation pressure is 30-48 MPa; further, the saturation pressure is 37 MPa.

In some embodiments, when the foaming material is used, the saturation time in the saturation process is at least 1 hour; further, the saturation time is 1.5-3 hours; further, the saturation time is 2.5 hours.

The applicant finds that the high-pressure saturation time of the plate can be significantly shortened after the permeation treatment by the penetrant with specific components, the foaming effects of uniform distribution and uniform size can still be achieved after saturation in a short time, and the mechanical properties of the obtained material also remain excellent.

The invention provides a physical foaming material in the second aspect, which is prepared by the environmentally friendly, efficient and low-cost method for preparing physical foaming materials.

The invention is described in detail by embodiments below. It should be pointed out that the following embodiments are only used to further describe the invention and cannot be understood as the limitation to the scope of protection of the invention. Some non-essential improvements and adjustments made by the professional technicians in the field according to the above contents of the invention are still within the scope of protection of the invention. In addition, the materials used are commercially available products unless otherwise noted.

Example 1: The example provides art environmentally friendly, efficient and low-cost method for preparing physical foaming materials, and the specific steps are as follows: mix LLDPE and TIP materials by the weight ratio of 3.3:6.7, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf inject the permeable medium (a mixture of water and cyclopentane, with a weight ratio of 3.2:1.2) to soak the plates, keep the temperature of the reaction kettle at 92 DEG C., during the soaking process, soak for 5.5 hours, inject the inert gas (nitrogen), ensure that the plates are saturated in the kettle for 2.5 hours at 37 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/$cm^3$); PP is FPC 5061 polypropylene (with density of 0.90 g/$cm^3$ and melt index of 7 g/10 min).

Example 2: The example provides an environmentally friendly, efficient and low-cost method for preparing physical foaming materials, and the specific steps are as follows: mix LLDPE and PP materials by the weight ratio of 3.3:6.7, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, inject the permeable medium (a mixture of water and cyclopentane, with a weight ratio of 3:1) to soak the plates, keep the temperature of the reaction kettle at 92 DEG C., during the soaking process, soak for 5.5 hours, inject the inert gas (nitrogen), ensure that the plates are saturated in the kettle for 1 hours at 58 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/$cm^3$); PP is FPC 5061 polypropylene (with density of 0.90 g/$cm^3$ and melt index of 7 g/10 min).

Example 3: The example provides an environmentally friendly, efficient and low-cost method for preparing physical foaming materials, and the specific steps are as follows: mix LLDPE and PP materials by the weight ratio of 33:67, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, inject the permeable medium (water) to soak the plates, keep the temperature of the reaction kettle at 90 DEG C., during the soaking process, soak for 5.5 hours, inject the inert gas (nitrogen), ensure that the plates are saturated in the kettle for 2.5 hours at 37 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/$cm^3$); PP is FPC 5061 polypropylene (with density of 0.90 g/$cm^3$ and melt index of 7 g/10 min).

Example 4: The example provides an environmentally friendly, efficient and low-cost method for preparing physical foaming materials, and the specific steps are as follows: mix LLDPE and PP materials by the weight ratio of 4:6, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, inject the permeable medium (a mixture of water and cyclopentane, with a weight ratio of 3.2:1.2) to soak the plates, keep the temperature of the reaction kettle at 92 DEG C., during the soaking process, soak for 5.5 hours, inject the inert gas (nitrogen), ensure that the plates are saturated in the kettle for 2.5 hours at 37 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/cm$^3$); PP is FPC 5061 polypropylene (with density of 0.90 g/cm$^3$ and melt index of 7 g/10 min).

Example 5: The example provides an environmentally friendly, efficient and low-cost method for preparing physical foaming materials, and the specific steps are as follows: mix LLDPE and PP materials by the weight ratio of 33:67, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, keep the temperature of the reaction kettle at 92 DEG C., perform heat treatment for 5.5 hours, lower the temperature to the room temperature, inject the inert gas (nitrogen), ensure that the plates are saturated in the kettle for 2.5 hours at 37 MPa, slowly release the pressure of the reaction kettle, remove and foam the saturated plates in the oven at 115 DEG C., for 20 minutes, and then plane and cut edges to get (lie physical foaming materials. Wherein, LLDPE is FPC 3470LLDPE with melt index of 21 g/10 min and density of 0.924 g/cm$^3$); PP is FPC 5061 polypropylene (with density of 0.90 g/cm$^3$ and melt index of 7 g/10 min).

Example 6: The example provides art environmentally friendly, efficient and low-cost method for preparing physical foaming materials, and the specific steps are as follows: add LLDPE material to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, inject the permeable medium (a mixture of water and cyclopentane, with a weight ratio of 3.2:1.2) to soak the plates, keep the temperature of the reaction kettle at 92 DEG C., during the soaking process, soak for 5.5 hours, inject the inert gas (nitrogen), ensure that the plates are saturated in the kettle for 2.5 hours at 37 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/cm$^3$); PP is FPC 5061 polypropylene (with density of 0.90 g/cm$^3$ and melt index of 7 g/10 min).

Example 7: The example provides an environmentally friendly, efficient and low-cost method for preparing physical foaming materials, and the specific steps are as follows: mix LLDPE and PP materials by the weight ratio of 3.3:6.7, add the mixture to the twin-screw extruder, adjust the temperatures of the extruder respectively to 190 DEG C., 190 DEG C., 220 DEG C., 220 DEG C., 220 DEG C. and 230 DEG C., melt, extrude and mold to get the plates to be foamed, place the plates to be foamed in the reaction kettle on the PVDF shelf, keep the temperature of the reaction kettle at 92 DEG C., perform heat treatment for 5.5 hours, lower the temperature to the room temperature, inject the inert gas (nitrogen), ensure that the plates are saturated in the kettle for 7.5 hours at 37 MPa, slowly release the pressure of the reaction kettle, remove and foam the saturated plates in the oven at 115 DEG C., for 20 minutes, and then plane and cut edges to get the physical foaming materials. Wherein, LLDPE is FPC 3470LLDPE (with melt index of 21 g/10 min and density of 0.924 g/cm$^3$); PP is FPC 5061 polypropylene (with density of 0.90 g/cm$^3$ and melt index of 7 g/10 min), Performance Test The applicant calculated the foamed cell density and tested the compression deformation rate of the foamed sample in the above examples, in which the cell density is the ratio of weight to volume of the foamed drying material, and the compression deformation rate is the ratio of the difference between the initial thickness of the sample and the thickness after compression (i.e. the thickness after spring-back) and the difference between the initial thickness of the sample and the thickness tinder compression. The results are shown in Table I below.

TABLE 1

Performance Test Results

| | Material Density/(g/cm$^3$) | Compression Deformation Rate/% |
|---|---|---|
| Example 1 | 0.08 | 1.4 |
| Example 2 | 0.09 | 2.6 |
| Example 3 | 0.19 | 3.4 |
| Example 4 | 0.14 | 7.9 |
| Example 5 | 0.26 | 1.6 |
| Example 6 | 0.05 | 5.7 |
| Example 7 | 0.23 | 1.7 |

As you can see from the above experimental results, the lightweight materials with good foaming performance and low cell density can be prepared by the physical foaming method in the invention, not only ensuring the excellent foaming effect, but also guaranteeing good mechanical properties of excellent resilience and compression and effectively avoiding material function failure during use.

In addition, it can be seen from the drawings for the specification that the foaming material prepared by the method of the invention has uniform pore distribution, uniform size and basically spherical or ellipsoidal structure, and basically has no parallel connection between the cell cavities and other problems. On the contrary, when the key steps and parameters of the adopted method are not adjusted properly, the structures of the cells are uneven, the adjacent cells run through each other, irregular cells appear, and even the large irregular cavity structures in the material seriously affect the mechanical properties of the material such as resilience.

The operations and steps disclosed in the examples of the invention relate to special parts of the invention, and other steps can be carried out according to operations familiar to the technicians in the field.

The foregoing are only preferred examples of the invention and do not limit the invention in any form, the examples in the invention and the characteristics in the examples can be combined to obtain new examples without conflict. Equivalent changes to a few changes, modifications and evolutions made by the technicians familiar with the specialty without deviating from the scope of the technical proposal of the invention are equivalent examples of the invention.

What is claimed is:

1. An environmentally friendly, efficient and low-cost method for preparing physical foaming materials, wherein the method comprises the following steps: place plates to be foamed in a reaction kettle, inject permeable medium into the reaction kettle for soaking treatment, saturate the plates in an inert gas, and then foam the plates at a high temperature condition; the temperature of the high temperature condition is not less than 80 DEG C;

wherein the raw materials of the plates to be foamed is polyolefin materials; the polyolefin materials comprise LLDPE (linear low density polyethylene) and PP (polypropylene), wherein the content of PP is not less than 40 wt %; and wherein the permeable medium is a combination of water and non-polar fluid, and the weight ratio of water to non-polar fluid is (3-5):1.

2. The method of claim 1, wherein the non-polar fluid comprises liquid alkanes whose boiling point is not higher than 105 DEG C.

3. The method of claim 1, wherein the non-polar fluid is selected from one or more of pentane, cyclopentane, hexane, heptane and isopentane.

4. The method of claim 1, wherein the plates are heated in the reaction kettle at a temperature of 80-110 DEG C during the soaking process.

5. The method of claim 1, wherein the saturation pressure in the kettle during the saturation process is 20-60 MPa.

6. The method of claim 5, wherein the saturation time in the saturation process is at least 1 hour.

* * * * *